US00RE33949E

United States Patent [19]

Mallary et al.

[11] E Patent Number: Re. 33,949

[45] Reissued Date of Patent: Jun. 2, 1992

[54] VERTICAL MAGNETIC RECORDING ARRANGEMENT

[75] Inventors: Michael L. Mallary, Berlin; Shyam C. Das, Sudbury, both of Mass.

[73] Assignee: Digital Equipment Corporation, Maynard, Mass.

[21] Appl. No.: 613,469

[22] Filed: Nov. 7, 1990

Related U.S. Patent Documents

Reissue of:

[64] Patent No.: 4,656,546
Issued: Apr. 7, 1987
Appl. No.: 693,522
Filed: Jan. 22, 1985

U.S. Applications:

[63] Continuation of Ser. No. 334,936, Apr. 7, 1989, abandoned.

[51] Int. Cl.[5] ..... G11B 5/127; G11B 5/23; G11B 5/147

[52] U.S. Cl. ..... 360/110; 360/119; 360/122; 360/126

[58] Field of Search ..... 360/110, 113, 119, 125, 360/126, 121, 122

[56] References Cited

U.S. PATENT DOCUMENTS 3,156,919 11/1964 Rutter ..... 360/121
4,575,777 3/1986 Hosokawa ..... 360/123

FOREIGN PATENT DOCUMENTS 58-88812 5/1983 Japan ..... 360/113

OTHER PUBLICATIONS

Iwasaki, et al., "An Analysis For The Magnetization Mode For High Density Magnetic Recording", IEEE Trans. on Magnetics, V MAG-13, No. 5, Sep. 1977 pp. 1272-1277.

Potter, et al., "Self-Consistent Computer Calculations For Perpendicular Magnetic Recording", IEEE Trans. on Magnetics, vol. MAG-16, No. 5, Sep. 1980, pp. 967-972.

Lazzari, et al., "Thin-Film Head Study For Perpendicular Recording", IEEE Trans. on Magnetics, vol. MA-G-17, No. 6, Nov. 1981, pp. 3120-3121.

Hanazono, et al., "Fabrication Of A Thin Film Head Using Polyimide Resin And Sputtered Ni-Fe Films[a)]", J. Appl. Phys. 53(3), Mar. 1982, pp. 2608-2610.

Shinagawa, et al., "Simulation Of Perpendicular Recording On Co-Cr Media With A Thin Permalloy Film-Ferrite Composite Head", J. Appl. Phys. 53(3), Mar. 1982, pp. 2585-2587.

Oshiki, et al., "A Thin Film Head For Perpendicular Magnetic Recording", J. Appl. Phys. 53(3), Mar. 1982, pp. 2593-2595.

*Primary Examiner*—A. J. Heinz
*Attorney, Agent, or Firm*—Fish & Richardson

[57] ABSTRACT

The present device provides a downstream magnetic shield which is integrally formed with a write pole section having a tip to make up a magnetic recording head. The shield and the write pole tip are located with small gap therebetween, so that magnetic flux which fringes from the magnetic write pole tip is intercepted by the shield. Accordingly such fringing flux does not pass through the recording medium, and hence if a data bit has been written into the recording medium its dipole identity will not be weakened by the fringing flux of a subsequent data bit being written into the magnetic recording medium. In addition, the magnetic recording medium is made up of a first layer of material having perpendicular uniaxial anisotropy and an underlying layer made of a material which has a low magnetic flux reluctance characteristic. Accordingly, the magnetic flux passes vertically through the first layer, along the second layer and finally passes vertically from the second layer through the first layer into the shield. The face of the shield is designed to be many times as large as the face of the write pole section so that the density of the flux from the tip is sufficient to effect a vertical recording while the density of the flux passing into the downstream magnetic shield is low and hence a previously recorded pattern is not reversed.

23 Claims, 2 Drawing Sheets

VERTICAL MAGNETIC RECORDING ARRANGEMENT

Matter enclosed in heavy brackets [ ] appears in the original patent but forms no part of this reissue specification; matter printed in italics indicates the additions made by reissue.

*This is a continuation of copending application Ser. No. 07/334,936 filed on Apr. 7, 1989, now abandoned.*

BACKGROUND

While magnetic recording of information is enormously successful, it has been found that in the prior art there is a limitation with respect to recording density. In the present state of the art the popular method of magnetic recording has been longitudinal recording. Magnetic recording systems to date generally recognize recorded bits of information by detecting pulse peaks within certain timing windows. Unfortunately systems often inadvertently shift pulse patterns, in time, with respect to the timing of the windows and this of course results in errors. It follows that when linear density is increased, the time windows in which the peak must be detected necessarily narrows and the systems become more sensitive to noise and there are resulting errors.

Magnetic recording techniques have turned to considering vertical recording as compared to longitudinal recording as a means for vastly improving the linear density of recorded information. Vertical magnetic recording has been accomplished by having the recording medium pass between two mirror image recording heads. The magnetic flux from a first recording head passes vertically from a first write tip through the magnetic recording medium to a second write tip (the write tip of a second recording head). The shape of the tips concentrate the flux and hence effect a magnetic polarization within the recording medium to provide recorded information. The magnetic flux having passed through the second tip is routed upstream to a flux return path of the second write head. The flux return head is designed to have a face which is many times larger than the write tip so that the flux passing into the flux return head is disbursed therealong and hence the flux density is low. The low density flux passes through the recording medium, upstream, to the flux return path of the first magnetic write head and therealong to complete a magnetic flux circuit. Because the density of the flux passing through the recording medium upstream is low, there is very little effect by way of reversing or weakening any patterns in the recording medium upstream.

In the prior art vertical recording technique there has been a prerequisite in that there has been required a relatively large distance between the write tip and the flux return path to prevent leakage flux cross-over. In other words in such techniques the full strength of the write flux is desired to effect a desired recording. However in such arrangements, as the described in U.S. Pat. No. 4,317,148 the downstream fringing flux, which is ignored, acts to reverse or weaken, the magnetic polarity of information having been previously recorded and to compensate therefor, the packing density has had to be reduced.

The present device employs a two layered recording medium, places the flux return section downstream and by specifically locating the write tip close to the flux return path, uses the flux return path as a magnetic shield to intercept downstream fringing flux and thus prevent reversal or weakening, of the magnetic polarity at the trailing edge of a recorded bit of information. As mentioned above the prior art is exemplified by the structure described in U.S. Pat. No. 4,317,148.

SUMMARY

The present device includes a two layered recording medium. The upper layer is comprised of a material having perpendicular uniaxial anisotropy, such as cobalt chromium, while the underlayer is comprised of material having a low magnetic reluctance such as nickel iron. In addition the present device includes a write pole section of a single write head (no mirror image write head is included) which is formed in a partial loop configuration, away from the downstream flux return section, so that there is no leakage along the height dimension of the write pole section. However, the partial loop configuration is designed to place the write tip X micro inches away from the flux section. Where X is in the range from G/2 to 2G and where G is the distance from the write tip face to the beginning of the low reluctance layer. The gap X is a small gap and hence most of the downstream fringing flux is intercepted by the flux return section so that the flux return section acts as a magnetic shield. The interception of the downstream fringing flux by the magnetic shield reduces the undesirable effect of reversing, or weakening, a previously recorded bit of information. The present device further provides magnetic shielding means which lie parallel to the tracks on the recording medium so that tracks which lie adjacent to the track being presently written do not suffer from magnetic polarity reversals or weakening of dipole identification by flux fringing in a side direction or orthogonally to the track presently written.

The objects and features of the present invention will be better understood by considering the following description taken in conjunction with the drawings wherein.

Figure 1:
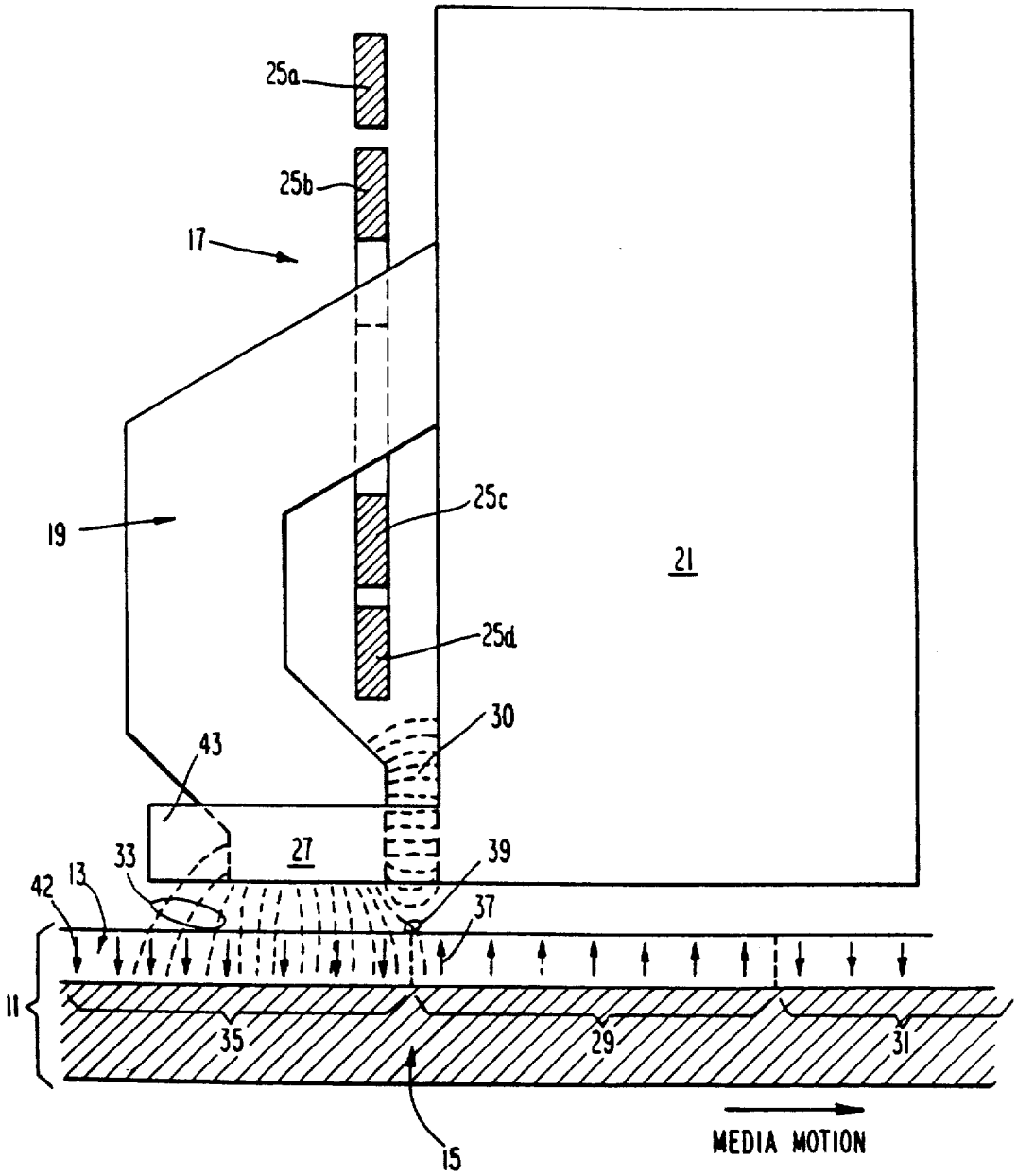
FIG. 1 is a side view of the write head depicting the write pole section formed in a partial loop and with the coils in sectional view form.

Consider FIG. 1. In FIG. 1 there is shown a section of the magnetic recording medium 11 which is made up of an upper layer 13 and a lower layer 15. The upper layer 13 in a preferred embodiment is cobalt chromium but it should be understood that any material which has perpendicular uniaxial anisotropy could be employed. The lower layer 15 in a preferred embodiment is nickel iron but it should be understood that any material which has a low magnetic reluctance could be employed. While it is not shown in FIG. 1, it should be understood that there is means to move the magnetic recording medium in a downstream direction, i.e. a disk drive or the like. As can be seen in FIG. 1, located in close proximity but with an air space in between, there is shown the write head 17. The write head 17 is made up of a write pole section 19 and downstream shield 21. The write pole section 19 is formed integrally with the shield 21 and is formed to extend upstream into a partial loop as can be gleaned from FIG. 1. By forming the write pole section 19 into a partial loop there is provided a bay or open section 23. By having the write pole section separated from the shield section 21 by the bay 23 there is little fringing magnetic flux passing from the write pole section 19 to the shield 21 through the bay 23, i.e. along the height dimension of the write head.

Figure 2:
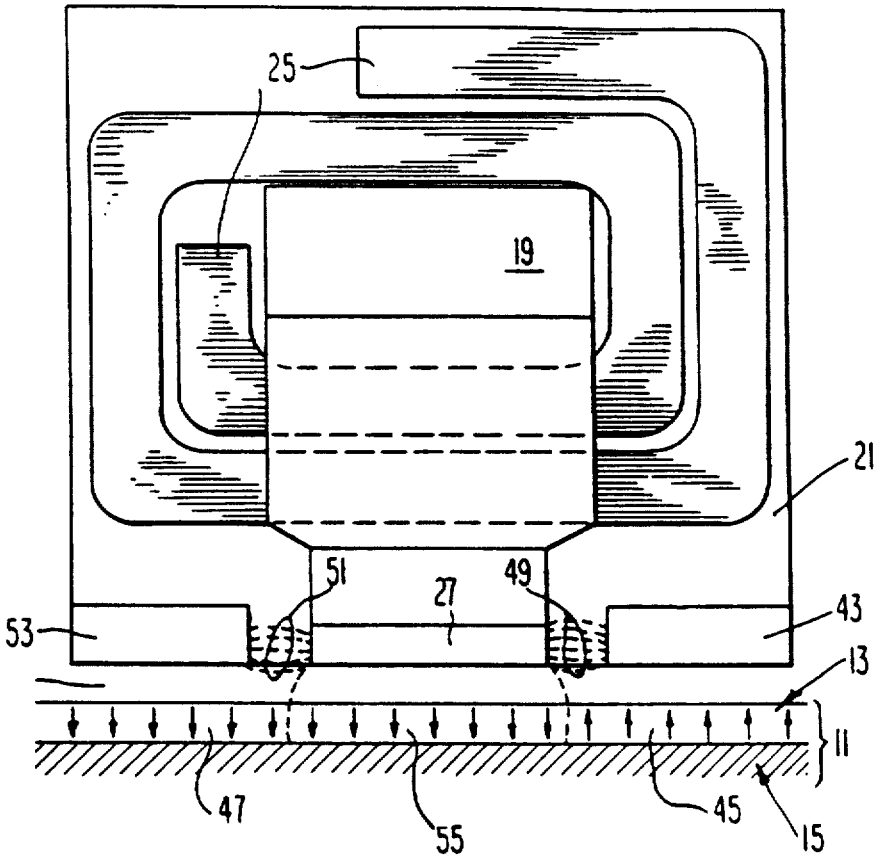
FIG. 2 is a view of the write head as seen looking at the excursion direction of the recording medium.

As can be readily understood from the examination of FIG. 1 there is a coil 25 shown with four sections in FIG. 1 and its configuration can be better understood by examining FIG. 2. While it is not shown in FIG. 1 it should be understood that the coil 25 is connected to a source of electrical power so that when the coil 25 is energized there is a magnetic flux generated in the write pole section 19. It should be further understood that by forming write pole section 19 into a partial loop, the pole tip portion 27 comes into close proximity to the downstream shield section 21. Accordingly there is a gap 30 which is labeled in the drawing as the shield gap located between the pole tip 27 and the lower portion of the downstream shield section 21. The selection of the width (X) of the gap 30 is important. It has been determined that if the distance between the bottom of the face of the pole tip 27 and the start of the lower layer 15 of the magnetic recording medium has a dimension of G then the width (X) of the shield gap 30 should not be any smaller than G/2. This concept is set forth in the drawing wherein the drawing depicts the width of the shield gap as being equal to or greater than G/2. In the preferred embodiment the shield gap is equal to G/2 because at that dimension virtually all of the fringing flux passes directly into the downstream shield 21 while there is still a sufficient amount of flux emanating from the pole tip 27 to effect a vertical magnetization in the layer 13. However, in order to obtain sufficient write field it may be necessary to increase the gap from G/2 to as much as 2G.

It should be borne in mind that the magnetic recording medium is moving from a left to right in FIG. 1 and that the data bit recorded in the section 29 of the layer 13 has been recorded and the user wants that data bit to remain recorded on the magnetic recording medium 11. Accordingly the system does not want fringing flux to disturb or weaken or even reverse the dipole identification of the data recorded in section 29. As depicted for purposes of illustration (and not with any scientific exactness) the flux passes from the pole tip 27, through the hard layer 13 and through the soft layer 15 and is concentrated, or sufficiently dense, to align the dipoles of the layer 13 so as to effect a vertical recording of information in sections along the layer 13, such as sections 29 and section 31. It should also be noted in FIG. 1 that fringing flux 33 is shown emanating from the left hand side from the pole tip 27. Such fringing flux indeed may disturb the dipole identification of a section of the magnetic recording medium entering under the write head but since that section is going to be rewritten it makes no difference that it is being disturbed. It is the downstream fringing flux that is the underside fringing flux and in accordance with the present device such fringing flux on the write end of the pole tip is intercepted by the shield section 21.

In order to have the magnetic flux emanate from the pole tip 27 and cause the write pattern to be developed, as shown in section 35, electrical current must be passing through the electrical coil as shown. In other words in the two upper legs 25a and 25b the current is passing into the figure while in the two segments 25c and 25d the current is passing out of the figure. In this way the flux will pass from the top of the figure through the write pole section and through the pole tip 27 as shown. As depicted in FIG. 1 the relative strength of the magnetized areas is shown by the arrows. It will be noted that the arrow 37 is somewhat shorter than the rest of the arrows in section 29 indicating that there has been a slight weakening of that dipole identification because of the fringing flux 39 overlapping segment 29 before section 29 passes from under the fringing flux 39. The reduction of this adverse effect (downstream demagnetization) in one of the salient features of the present invention. By way of comparison the arrow 42 is shown as being a bit diminished even though it has not been under the pole tip at the point in time shown in FIG. 1 but has been diminished because of the conditions under which it was recorded at some previous time.

As can be seen further in FIG. 1 there is a side shield 43 whose role is to intercept fringing flux that would pass over adjacent tracks, i.e. which are adjacent to the track on the magnetic recording medium which is passing under the pole tip at the time depicted in FIG. 1. The arrangement and the utility of the side shield 43 will be better understood by an examination of FIG. 2.

In FIG. 2 the various pieces of structure described in FIG. 1 are identified by the same numbers. As can be seen in FIG. 2 the pole tip 27 provides fringing flux in the direction of the side tracks 45 and 47. That fringing flux is depicted in FIG. 2 as the fringing flux 49 and fringing flux 51. The fringing flux 49 is intercepted by the side shield 43 while the fringing flux 51 is intercepted by the side shield 53. Accordingly the tracks 45 and 47 which lie adjacent to the track 55, that is the track that is being presently written upon in accordance with the arrangement depicted in FIG. 2, are not adversely affected by fringing flux. The gap between the pole tip 27 and the side shield 43 as well as the gap between the pole 27 and the side shield 53 can be larger than the downstream shield gap 30 so as to reduce the loss of flux to the shields.

Figure 3:
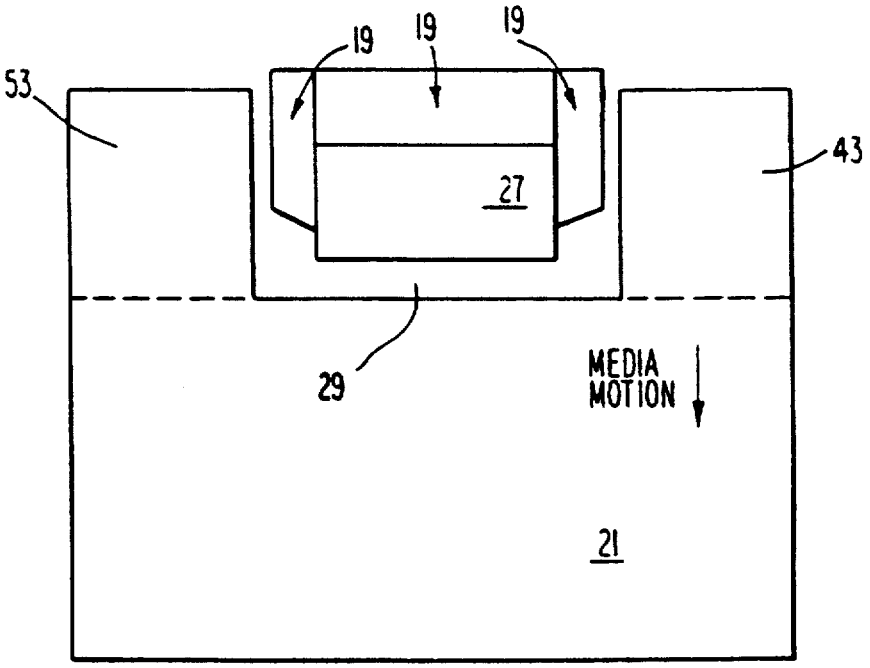
FIG. 3 is an underside view of FIG. 2.

FIG. 3 depicts the underside of the device shown in FIG. 2. The identification numbers of the structure in FIG. 3 are the same as the identification numbers in FIGS. 1 and 2 and no further explanation thereof appears to be necessary. The arrangement of the device shown in FIG. 3 however does enable a clear understanding of the overall device particularly how the side shields are formed with respect to the downstream shield and with respect to the winged arrangements of the write pole section 19.

By arranging to have the shield extension of the write head located downstream of the write tip and by arranging to have the gap there between be relatively small, but not so small as to permit all of the flux to be intercepted by the shield, the present structure creates less of a diminishing effect on data information which has been previously written into the magnetic recording medium. In addition by having the write pole section formed into a partial loop, the amount of fringing flux which jumps the separation between the write pole section and the flux return section is minimized and the bay portion of the partial loop configuration provides a location for the magnetic flux generating coils. It is important to note that the gap dimension in the preferred embodiment is related to the distance between the bottom of the pole tip and the beginning of the soft layer or the layer having the low magnetic reluctance. If the air bearing, that is the distance between the pole tip and the upper surface of the hard layer 13, is decreased then the gap can be increased because there will be a greater incentive for the flux to pass through the layer 13 as a result of the reduced air bearing. As can be readily seen in FIG. 1 the vast majority of the flux passes through the layer 13 in a vertical direction and hence there is a vertical recording of the data in the layer 13. It should be further noted from the description and by examination of FIG. 1 that the face of the downstream shield 21 is many times larger than the face of the pole tip. In point of fact the pole tip 27 could have an even narrower face than shown in FIG. 1. By providing a rather large downstream shield face, the flux is dispersed along that face and hence is relatively low in density. Because of the low density aspect of the flux passing on the return path into the downstream shield 21 there is very little effect on the magnetization condition in the layer 13 which lies under the shield. By not disturbing the magnetization pattern under the shield face one of the major objectives of the present system is accomplished.

I claim:

1. An arrangement for effecting vertical magnetic recording of information comprising in combination: movable magnetizable recording means formed to have first and second layers which lie substantially parallel to the movement of said magnetizable recording means, said first layer comprised of magnetizable material which is characterized by perpendicular uniaxial anisotropy and said second layer comprised of material characterized by low magnetic reluctance, said magnetizable recording means arranged to be moved in a downstream direction; magnetic recording head means including magnetic flux generating means, formed to have a write pole section and a downstream magnetic shield section which is integrally connected to said write pole section so that magnetic flux can readily pass, bi-directionally, through said write pole section and said downstream magnetic shield section; said downstream magnetic shield section formed and disposed to have a relatively large face lying in close proximity to said first layer; said write pole section fashioned, while extending in an upstream direction from said downstream magnetic shield section, to form a partial loop configuration defining an opening and ending in a pole tip which is disposed to lie in close proximity to said first layer so that the magnetic flux passing into and alternatively out of said write pole section will pass from said first layer through said pole tip and alternatively from said pole tip into said first layer, said write pole section being further formed and disposed such that a small gap having a sufficiently small width is formed between said pole tip and said downstream magnetic shield section so that, when said pole tip has magnetic flux passing therethrough, fringing flux in the downstream direction will substantially pass across said small gap into said downstream magnetic shield face without passing through said first layer, and whereby the remainder of said magnetic flux passing through said pole tip passes substantially vertically through said first layer into said second layer, substantially parallel to and through said second layer, and substantially vertically from said second layer through said first layer into said downstream magnetic shield face, thereby effecting vertical magnetic recording of information in said first layer.

2. An arrangement for effecting vertical magnetic recording according to claim 1 wherein there is a distance from where said magnetic flux leaves said pole tip and enters said second layer and wherein said distance is G and wherein the width of said small gap is between G/2 and 2G.

3. An arrangement for effecting vertical magnetic recording according to claim 1 wherein said magnetic flux generating means is a wire coil which in part passes through the opening in said partial loop configuration of said write pole section.

4. An arrangement for effecting vertical magnetic recording according to claim 1 wherein said write pole tip defines a track on said magnetic recording means and wherein there is further included side magnetic shield means which are disposed to lie in close proximity to said write pole section along at least one adjacent track position to form at least one side gap therebetween to enable said side shield means to intercept magnetic flux which is fringing from said magnetic write pole tip in the direction of tracks adjacent to said track defined by the passage of said magnetic recording means relative to said write pole tip.

5. An arrangement for effecting magnetic recording according to claim 4 wherein said side magnetic shield means includes first and second side magnetic shield means each of which is disposed to lie on opposite sides of, and in close proximity to, said write pole section to respectively form first and second gaps between said first and second side magnetic shield means and said write pole section to enable said first and second side shield means to intercept magnetic flux [while] *which* is fringing from said magnetic write pole tip in the direction of tracks adjacent to said track defined by the extension of said write pole tip onto said magnetic recording means.

*6. A magnetic transducing head device, operable in conjunction with and from a preferred side of a layered vertical recording medium arranged to be moved in a downstream direction for effecting vertical recording of bits of information in tracks thereon, the device comprising*

*magnetic flux generating means including*

*a write pole section, and*

*a downstream magnetic shield section which is integrally connected to said write pole section so that magnetic flux can readily pass through said write pole section and said downstream magnetic shield section,*

*said downstream magnetic shield section formed and disposed to have a relatively large face defining an air bearing surface which can be operated in close proximity to said preferred side of said medium,*

*said write pole section and said downstream magnetic shield section being constructed so that said write pole section is disposed in an upstream direction with respect to said downstream magnetic shield section so that said write pole section and said downstream magnetic shield section form a partial loop configuration that defines an opening between said write pole section and said downstream magnetic shield section, said write pole section ending in a pole tip which is disposed to be operated in close proximity to said medium so that the magnetic flux passing through said write pole section will pass from said pole tip into said medium,*

*said opening defining a gap at a midsection of said write pole section and said downstream magnetic shield section and a relatively smaller gap between said pole tip and said downstream magnetic shield section, said smaller gap having a sufficiently small width so that, when said pole tip has magnetic flux passing therethrough, fringing flux in the downstream direction will be substantially directed to pass from said pole tip across said smaller gap into said downstream magnetic shield, such that substantially all of the remainder of said magnetic flux is presented for passing*

*through said pole tip substantially vertically into said medium and then to said downstream magnetic shield face, and*

*whereby sharply defined bits of information may be vertically recorded at said pole tip in tracks on said medium.*

*7. The device of claim 6 wherein said magnetic flux generating means is a wire coil which in part passes through the opening in said partial loop configuration.*

*8. The head device of claim 6 further including side magnetic shield means disposed to lie in close proximity to said write pole section along at least one track adjacent to a track to be written on said medium at said pole tip to form at least one side gap between said side shield means and said write pole section to enable said side shield means to intercept magnetic flux which is fringing from said pole tip in the direction of said at least one adjacent track.*

*9. The head device of claim 8 wherein said side shield means includes first and second side magnetic shield means each of which is disposed to lie on opposite side of, and in close proximity to, said write pole section to respectively form first and second gaps between said first and second side magnetic shield means and said write pole section to enable said first and second side shield means to intercept magnetic flux from said magnetic write pole tip in the direction of tracks adjacent to a track to be written at said pole tip on said medium.*

*10. The device of claim 6 wherein said write pole section is constructed with a bowed region to define said partial loop configuration.*

*11. A magnetic transducing head device having at least one pole for effecting vertical recording of magnetic transitions on and from a preferred side of a layered vertical magnetic recording medium arranged to be moved in a downstream direction, the device comprising*

*a write pole terminating in a write pole tip,*

*a downstream shield integrally connected to the write pole and having a large shield tip area relative to the area of the write pole tip,*

*the write pole cooperating with the downstream shield to engage flux from a write flux source,*

*the write pole tip configured to present write flux from the write flux source to the medium for recording information on the medium, and*

*the write pole and said downstream shield being constructed to define a gap between them, said gap being smaller in the area of the write pole tip and the downstream shield tip than it is in an area closer to where the downstream shield is integrally connected to said write pole,*

*said gap between the write pole tip and the downstream shield tip being sufficiently small to substantially transfer to the downstream shield downstream fringing flux emanating from the write pole tip to minimize presentation of downstream fringing flux to the medium when presenting write flux from the pole tip to the medium for recording information on the medium, whereby a write field gradient generated by the write flux in the recording medium is increased and recorded transitions are sharper, as a result of such minimization.*

*12. The device of claim 11 wherein the write flux source is a wire coil, that passes through at least a portion of said gap.*

*13. The head device of claim 11 further including side magnetic shield means disposed to lie in close proximity to the write pole section along at least one track adjacent to a track to be written on the medium at the pole tip to form at least one side gap therebetween to enable the side shield means to intercept magnetic flux fringing from the pole tip in the direction of the at least one adjacent track.*

*14. The head device of claim 13 wherein the side shield means includes first and second side magnetic shield means each of which is disposed to lie on opposite sides of, and in close proximity to, the write pole section to respectively form first and second gaps between the first and second side magnetic shield means and the write pole section to enable the first and second side shield means to intercept magnetic flux from the magnetic write pole tip in the direction of tracks adjacent to a track to be written at the pole tip on the medium.*

*15. The device of claim 11 wherein said write pole is constructed with a bowed region to define said gap and said smaller gap.*

*16. A magnetic transducing head device, operable in conjunction with and from a preferred side of a layered vertical recording medium arranged to be moved in a downstream direction for effecting vertical recording of bits of information in tracks thereon, comprising*

*magnetic flux generating means, including*

*a write pole section, and*

*a downstream magnetic shield section which is integrally connected to said write pole section so that magnetic flux can readily pass through said write pole section and said downstream magnetic shield section,*

*said downstream magnetic shield section formed and disposed to have a relatively large face defining an air bearing surface which can be operated in close proximity to said preferred side of said medium, said write pole section fashioned, while extending in an upstream direction from said downstream magnetic shield section, to form a partial loop configuration defining an opening and ending in a pole tip which is disposed to be operated in close proximity to said medium so that the magnetic flux passing through said write pole section will pass from said pole tip into said medium,*

*said write pole section being further formed and disposed with a bowed out midsection with a small gap having a sufficiently small width formed between said pole tip and said downstream magnetic shield section so that, when said pole tip has magnetic flux passing therethrough, fringing flux in the downstream direction will be substantially directed to pass from the side of said pole tip across said small gap into said downstream magnetic shield, such that substantially all of the remainder of said magnetic flux is presented for passing through said pole tip substantially vertically into said medium and then to said downstream magnetic shield face,*

*whereby sharply defined bits of information may be vertically recorded at said pole tip in tracks on said medium, and further including side magnetic shield means disposed to lie in close proximity to said write pole section along at least one track adjacent to a track to be written on said medium at said pole tip to form at least one side gap between said side shield means and said write pole section to enable said side shield means to intercept magnetic flux which is fringing from said pole tip in the direction of said at least one adjacent track.*

*17. The device of claim 16 wherein said side shield means includes first and second side magnetic shield means each of which is disposed to lie on opposite sides of, and in close proximity to, said write pole section to respectively form first and second gaps between said first and*

*second side magnetic shield means and said write pole section to enable said first and second side shield means to intercept magnetic flux from said magnetic write pole tip in the direction of tracks adjacent to a track to be written at said pole tip on said medium.*

*18. A magnetic head having at least one pole for effecting downstream vertical recording of magnetic transitions on a layered vertical magnetic recording medium via a write field gradient comprising*

*a write pole terminating in a write pole tip,*

*a downstream shield integrally connected to the write pole and having a large shield tip area relative to the area of the write pole tip,*

*the write pole cooperating with the downstream shield to engage flux from a write flux source,*

*the write pole tip configured to present write flux from the write flux source to the medium for recording information on the medium,*

*the write pole proximally coupled to the downstream shield to substantially capture downstream fringing flux emanating from the write pole to minimize presentation of downstream fringing flux to the medium when presenting write flux from the pole tip to the medium for recording information on the medium, whereby the write field gradient at the pole tip is increased and recorded transitions are sharper, as a result of such minimization, and*

*further including side magnetic shield means disposed to lie in close proximity to the write pole section along at least one track adjacent to a track to be written on the medium at the pole tip to form at least one side gap therebetween to enable the side shield means to intercept magnetic flux fringing from the pole tip in the direction of the at least one adjacent track.*

*19. The head of claim 18 wherein the side shield means includes first and second side magnetic shield means each of which is disposed to lie on opposite sides of, and in close proximity to, the write pole section to respectively form first and second gaps between the first and second side magnetic shield means and the write pole section to enable the first and second side shield means to intercept magnetic flux from the magnetic write pole tip in the direction of tracks adjacent to a track to be written at the pole tip on the medium.*

*20. An arrangement for effecting vertical magnetic recording of information comprising in combination:*

*movable magnetizable recording means formed to have first and second layers which lie substantially parallel to the movement of said magnetizable recording means, said first layer comprised of magnetizable material which is characterized by perpendicular uniaxial anisotropy and said second layer comprised of material characterized by low magnetic reluctance, said magnetizable recording means arranged to be moved in a downstream direction;*

*magnetic recording head means including magnetic flux generating means, formed to have a write pole section and a downstream magnetic shield section which is integrally connected to said write pole section so that magnetic flux can readily pass, bidirectionally, through said write pole section and said downstream magnetic shield section;*

*said downstream magnetic shield section formed and disposed to have a relatively large face lying in close proximity to said first layer;*

*said write pole section and said downstream magnetic shield section being constructed so that said write pole section is disposed in an upstream direction with respect to said downstream magnetic shield section so that said write pole section and said downstream magnetic shield section form a partial loop configuration that defines an opening between said write pole section and said downstream magnetic shield section, said write pole section ending in a pole tip which is disposed to lie in close proximity to said first layer so that the magnetic flux passing into and alternatively out of said write pole section will pass from said first layer through said pole tip and alternatively from said pole tip into said first layer,*

*said opening defining a small gap between said pole tip and said downstream magnetic shield section that has a sufficiently small width so that, when said pole tip has magnetic flux passing therethrough, fringing flux in the downstream direction will substantially pass across said small gap into said downstream magnetic shield section without passing through said first layer, and whereby the remainder of said magnetic flux passing through said pole tip passes substantially vertically through said first layer into said second layer, substantially parallel to and through said second layer, and substantially vertically from said second layer through said first layer into said downstream magnetic shield face, thereby effecting vertical magnetic recording of information in said first layer.*

*21. The device of claim 20 wherein said write pole section is constructed with a bowed region to define said partial loop configuration.*

*22. An arrangement for effecting vertical magnetic recording of information comprising in combination:*

*movable magnetizable recording means formed to have first and second layers which lie substantially parallel to the movement of said magnetizable recording means, said first layer comprised of magnetizable material which is characterized by perpendicular uniaxial anisotropy and said second layer comprised of material characterized by low magnetic reluctance, said magnetizable recording means arranged to be moved in a downstream direction;*

*magnetic recording head means including magnetic flux generating means, formed to have a write pole section and a downstream magnetic shield section which is integrally connected to said write pole section so that magnetic flux can readily pass, bidirectionally, through said write pole section and said downstream magnetic shield section;*

*said downstream magnetic shield section formed and disposed to have a relatively large face lying in close proximity to said first layer;*

*said write pole section and said downstream magnetic shield section being constructed so that said write pole section is disposed in an upstream direction with respect to said downstream magnetic shield section so that said write pole section and said downstream magnetic shield section form a partial loop configuration that defines a first gap between said write pole section and said downstream magnetic shield section, said write pole section ending in a pole tip which is disposed to lie in close proximity to said first layer so that the magnetic flux passing into and alternatively out of said write pole section will pass from said first layer through said pole tip and alternatively from said pole tip into said first layer,*

*said partial loop configuration defining a second gap of narrower width than said first gap between said pole tip and said downstream magnetic shield section, said width of said second gap being sufficiently small such*

*that when said pole tip has magnetic flux passing therethrough, fringing flux in the downstream direction will substantially pass across said small gap into said downstream magnetic shield without passing through said first layer, and whereby the remainder of said magnetic flux passing through said pole tip passes substantially vertically through said first layer into said second layer, substantially parallel to and through said second layer, and substantially vertically from said second layer through said first layer into said downstream magnetic shield face, thereby effecting vertical magnetic recording of information in said first layer.*

*23. The device of claim 22 wherein said write pole section is constructed with a bowed region to define said partial loop configuration.*

* * * * *

UNITED STATES PATENT AND TRADEMARK OFFICE

CERTIFICATE OF CORRECTION

PATENT NO. : RE 33,949

DATED : June 2, 1992

INVENTOR(S) : Michael L. Mallary et al.

It is certified that error appears in the above-identified patent and that said Letters Patent is hereby corrected as shown below:

Column 2, line 21, after "flux" insert --return--.

Column 3, line 55, "underside" should be --undesirable--.

Column 4, line 49, "there between" should be --therebetween--.

Column 4, line 66, "increased" should be --decreased--.

Column 7, line 20, claim 9, "side" should be --sides--.

Signed and Sealed this

Fifteenth Day of March, 1994

Bruce Lehman

BRUCE LEHMAN

*Commissioner of Patents and Trademarks*

*Attest:*

*Attesting Officer*